US010937324B2

(12) United States Patent
Vaughn et al.

(10) Patent No.: US 10,937,324 B2
(45) Date of Patent: Mar. 2, 2021

(54) ORCHESTRATION IN HETEROGENEOUS DRONE SWARMS

(71) Applicant: Intel Corporation, Santa Clara, CA (US)

(72) Inventors: Robert Lawson Vaughn, Portland, OR (US); Paul Carbin, Albuquerque, NM (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 16/267,629

(22) Filed: Feb. 5, 2019

(65) Prior Publication Data

US 2019/0392717 A1 Dec. 26, 2019

(51) Int. Cl.
*G08G 5/00* (2006.01)
*B64C 39/02* (2006.01)

(52) U.S. Cl.
CPC ......... *G08G 5/0043* (2013.01); *B64C 39/024* (2013.01); *B64C 2201/143* (2013.01)

(58) Field of Classification Search
CPC .. G08G 5/0043; G08G 5/0021; G08G 5/0069; G08G 5/006; G08G 5/0008; B64C 39/024; B64C 2201/143
See application file for complete search history.

(56) References Cited

U.S. PATENT DOCUMENTS

| 10,481,600 | B2* | 11/2019 | Yen | G05D 1/0295 |
|---|---|---|---|---|
| 2017/0090483 | A1* | 3/2017 | Smith | B64C 39/024 |
| 2018/0129223 | A1* | 5/2018 | High | G05D 1/0206 |
| 2018/0143649 | A1* | 5/2018 | Miao | B60W 60/00 |
| 2018/0329434 | A1* | 11/2018 | Smith | B64C 39/024 |
| 2019/0329909 | A1* | 10/2019 | Chan | B64F 5/60 |
| 2020/0233411 | A1* | 7/2020 | Ivanov | G05D 1/104 |

* cited by examiner

*Primary Examiner* — Mary Cheung

(74) *Attorney, Agent, or Firm* — Schwegman Lundberg & Woessner, P.A.

(57) ABSTRACT

A drone system for orchestration in heterogeneous drone swarms is configured to perform operations comprising receiving, at a lead drone of a drone swarm, from a candidate drone, a request to join the drone swarm; transmitting a swarm directive to the candidate drone; evaluating the candidate drone to determine whether the candidate drone is compatible with the swarm directive; and adjusting the swarm directive to accommodate the candidate drone when the candidate drone is compatible with the swarm directive, to add the candidate drone to the drone swarm.

25 Claims, 7 Drawing Sheets

US 10,937,324 B2

ORCHESTRATION IN HETEROGENEOUS DRONE SWARMS

TECHNICAL FIELD

Embodiments described herein generally relate to autonomous robots, and in particular, to systems and methods for orchestration in heterogeneous drone swarms.

BACKGROUND

Autonomous robots, which may also be referred to or include drones, unmanned aerial vehicles, and the like, are vehicles that operate partially or fully without human direction. Autonomous robots use geo-positioning for a variety of purposes including navigation, mapping, and surveillance.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Drones may be used in a variety of situations. In some cases, multiple drones may operate within shared airspace. Drones flown under independent direction in close proximity to one another are at risk of collision or interference. Independent drone control decreases the overall quantity of drones that could be flown in the same airspace.

For a given event that may attract drones and drone operators, such as a fire, a sporting event, a natural disaster, etc., having two or three drones operating in the same area may not cause issues. However, as the number of drones increase, at some point, a mid-air collision becomes nearly certain. What is needed is a mechanism to orchestrate and coordinate drone swarms. The orchestration provides a mechanism for drones to join or leave a swarm in a coordinated manner. Further, the orchestration enables manual or autonomous drone operation, based on various factors. Also, the orchestration provides each drone in the swarm the ability to observe the event in a fair manner. The orchestration also provides the ability to adapt to an evolving point of interest, or points of interest, as an event unfolds. For instance, in a forest fire, the drone swarm may be interested in a first hot spot, but later when another hot spot ignites, the drone swarm may be redirected to cover both the first and second hot spots, or move to the second hot spot. Additional aspects of drone orchestration are disclosed herein.

While the term "drone" is used within this document, it is understood that the usage applies broadly to any type of autonomous or semi-autonomous robots or vehicles, which may include un-crewed vehicles, driverless cars, robots, unmanned aerial vehicles, or the like.

Figure 1:
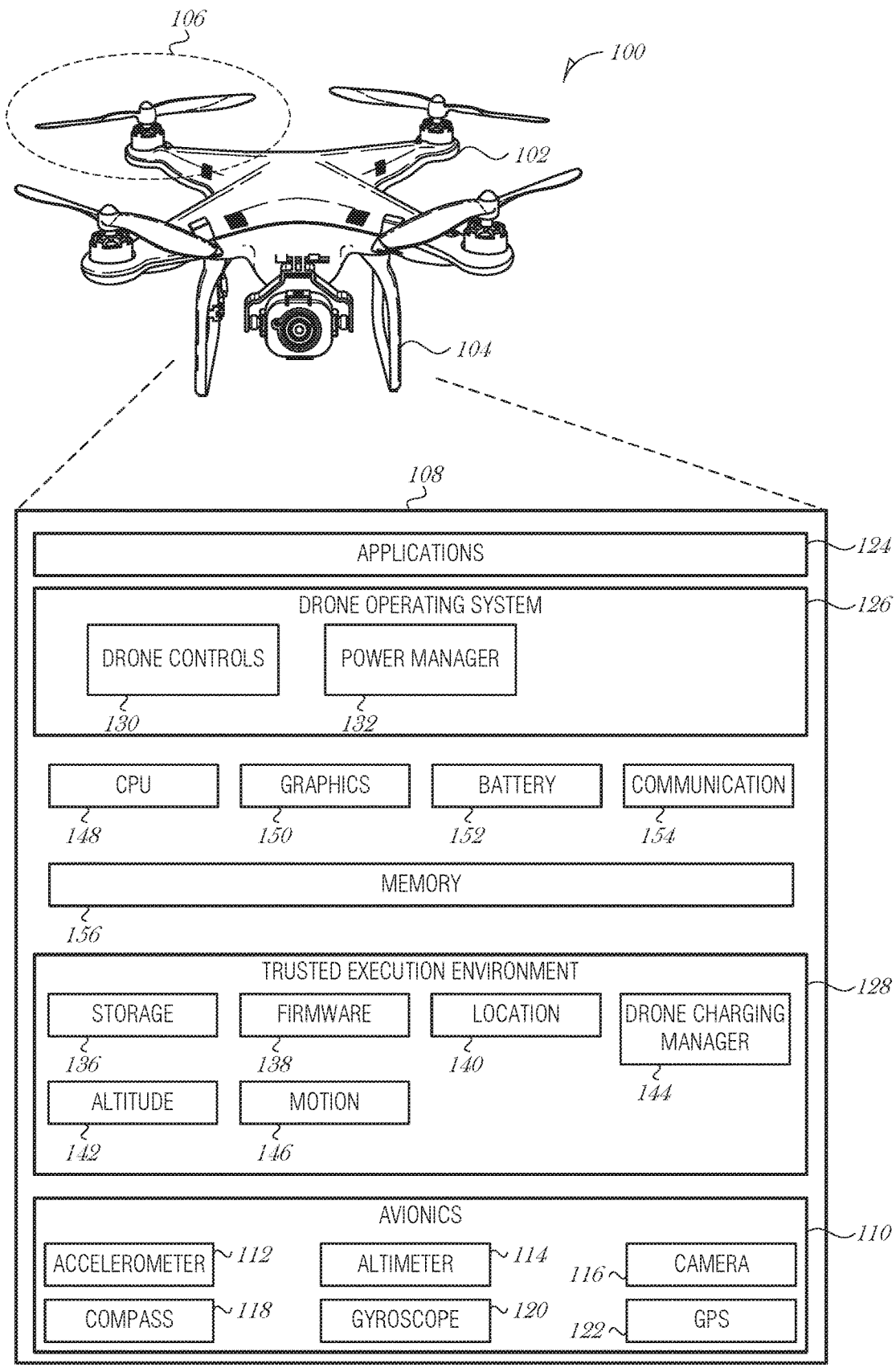
FIG. 1 is a block diagram illustrating a drone, according to an embodiment.

FIG. 1 is a block diagram illustrating a drone 100, according to an embodiment. The drone 100 may include an airframe 102, a landing support structure 104, a flight mechanism 106, and a control environment 108. The airframe 102 may be made of polymers, metals, etc. Other components of the drone 100 may be secured to the airframe 102.

The flight mechanism 106 may include mechanisms that propel the drone 100 through the air. For example, the flight mechanism 106 may include propellers, rotors, turbofans, turboprops, etc. The flight mechanism 106 may operably interface with avionics 110. The avionics 110 may be part of the control environment 108 (as shown in FIG. 1) or as standalone components. The avionics 110 may include an accelerometer 112, an altimeter 114, a camera 116, a compass 118, gyroscopes 120, and a global positioning system (GPS) receiver 122.

The various components of the avionics 110 may be standalone components or may be part of an autopilot system or other avionics package. For example, the altimeter 114 and GPS receiver 122 may be part of an autopilot system that include one or more axes of control. For instance, the autopilot system may be a two-axis autopilot that may maintain a preset course and hold a preset altitude. The avionics 110 may be used to control in-flight orientation of the drone 100. For example, the avionics 110 may be used to control orientation of the drone 100 about pitch, bank, and yaw axes while in flight. As the drone 100 approaches a power source, the drone 100 may need to maintain a particular angle, position, or orientation in order to facilitate coupling with the power source.

In many cases, the drone 100 operates autonomously within the parameters of some general protocol. For example, the drone 100 may be directed to deliver a package to a certain residential address or a particular geo-coordinate. The drone 100 may act to achieve this directive using whatever resources it may encounter along the way.

In other cases where the drone 100 does not operate in fully autonomous mode, the camera 116 may allow an operator to pilot the drone 100. Non-autonomous, or manual flight, may be performed for a portion of the drone's operational duty cycle, while the rest of the duty cycle is performed autonomously.

The control environment 108 may also include applications 124, a drone operating system (OS) 126, and a trusted execution environment (TEE) 128. The applications 124 may include services to be provided by the drone 100. For example, the applications 124 may include a surveillance program that may utilize the camera 116 to perform aerial surveillance. The applications 124 may include a communications program that allows the drone 100 to act as a cellular repeater or a mobile Wi-Fi hotspot. Other applications may be used to operate or add additional functionality to the drone 100. Applications may allow the drone 100 to monitor vehicle traffic, survey disaster areas, deliver packages, perform land surveys, perform in light shows, or other activities including those described elsewhere in this document. In many of these operations drones are to handle maneuvering around obstacles to locate a target.

The drone OS 126 may include drone controls 130, a power management program 132, and other components. The drone controls 130 may interface with the avionics 110 to control flight of the drone 100. The drone controls 130 may optionally be a component of the avionics 110, or be located partly in the avionics 110 and partly in the drone OS 126. The power management program 132 may be used to manage battery use. For instance, the power management program 132 may be used to determine a power consumption of the drone 100 during a flight. For example, the drone 100 may need a certain amount of energy to fly to a destination and return to base. Thus, in order to complete a roundtrip mission, the drone 100 may need a certain battery capacity. As a result, the power management program 132 may cause the drone 100 to terminate a mission and return to base.

The TEE 128 may provide secured storage 136, firmware, drivers and kernel 138, a location processing program 140, an altitude management program 142, and a motion processing program 146. The components of the TEE 128 may operate in conjunction with other components of the drone 100. The altitude management program 142 may operate with the avionics 110 during flight.

The TEE 128 may provide a secure area for storage of components used to authenticate communications between drones or between a drone and a base station. For example, the TEE 128 may store SSL certificates or other security tokens. The data stored in the TEE 128 may be read-only data such that during operation the data cannot be corrupted or otherwise altered by malware or viruses.

The control environment 108 may include a central processing unit (CPU) 148, a video/graphics card 150, a battery 152, a communications interface 154, and a memory 156. The CPU 148 may be used to execute operations, such as those described herein. The video/graphics card 150 may be used to process images or video captured by the camera 116. The memory 156 may store data received by the drone 100 as well as programs and other software utilized by the drone 100. For example, the memory 156 may store instructions that, when executed by the CPU 148, cause the CPU 148 to perform operations such as those described herein. The communications interface 154 may include a radio, antenna, web server, wireless router, or other circuitry to provide wireless communication using Bluetooth, Wi-Fi, cellular, or other networks.

The battery 152 may provide power to the drone 100. While FIG. 1 shows a single battery, more than one battery may be utilized with drone 100. While FIG. 1 shows various components of the drone 100, not all components shown in FIG. 1 are required. More or fewer components may be used on a drone 100 according to the design and use requirements of the drone 100.

The drone 100 may be an unmanned aerial vehicle (UAV), such as is illustrated in FIG. 1, in which case it includes one or more flight mechanisms (e.g., flight mechanism 106) and corresponding control systems (e.g., control environment 108). The drone may alternatively be a terrestrial drone, in which case it may include various wheels, tracks, legs, propellers, or other mechanisms to traverse over land. The drone may also be an aquatic drone, in which case it may use one of several types of marine propulsion mechanisms, such as a prop (propeller), jet drive, paddle wheel, whale-tail propulsion, or other type of propulsor.

Drones may be programmed or otherwise configured to perform a task of their own, such as to surveille an area by moving from waypoint to waypoint or by traversing a boundary of a geofence, for example. Other tasks may include traffic monitoring, news coverage, or the like. Additionally, a drone may be operated partially or fully by a human user.

A drone swarm is a group of two or more drones acting under common control. Drones in a drone swarm may move together in a tight group or may operate seemingly independent from one another while maintaining a cooperative flight plan.

A drone swarm includes a lead drone. The lead drone may be elected through various mechanisms. One example mechanism is a random time delay mechanism. Each drone that is a candidate for the leader position may initiate a random time delay using agreed upon parameters (e.g., random time between zero and ten seconds). A random value is calculated by each drone and the drones wait for the time represented by the random value. The first drone to awake take the leader role and broadcasts an identifier and other signaling to indicate that it is the leader. Other drones may abort their timers and join the swarm as subordinate drones.

The lead drone may use a communication circuit (e.g., communications interface 154) and advertise a drone control channel. For instance, the lead drone may advertise a wireless access point or other beacon, which other drones may use to communicate with the lead drone. An application programming interface (API) may be provided over the advertised channel to allow onboarding drones to provide information about their capabilities and operation parameters.

Figure 2A:
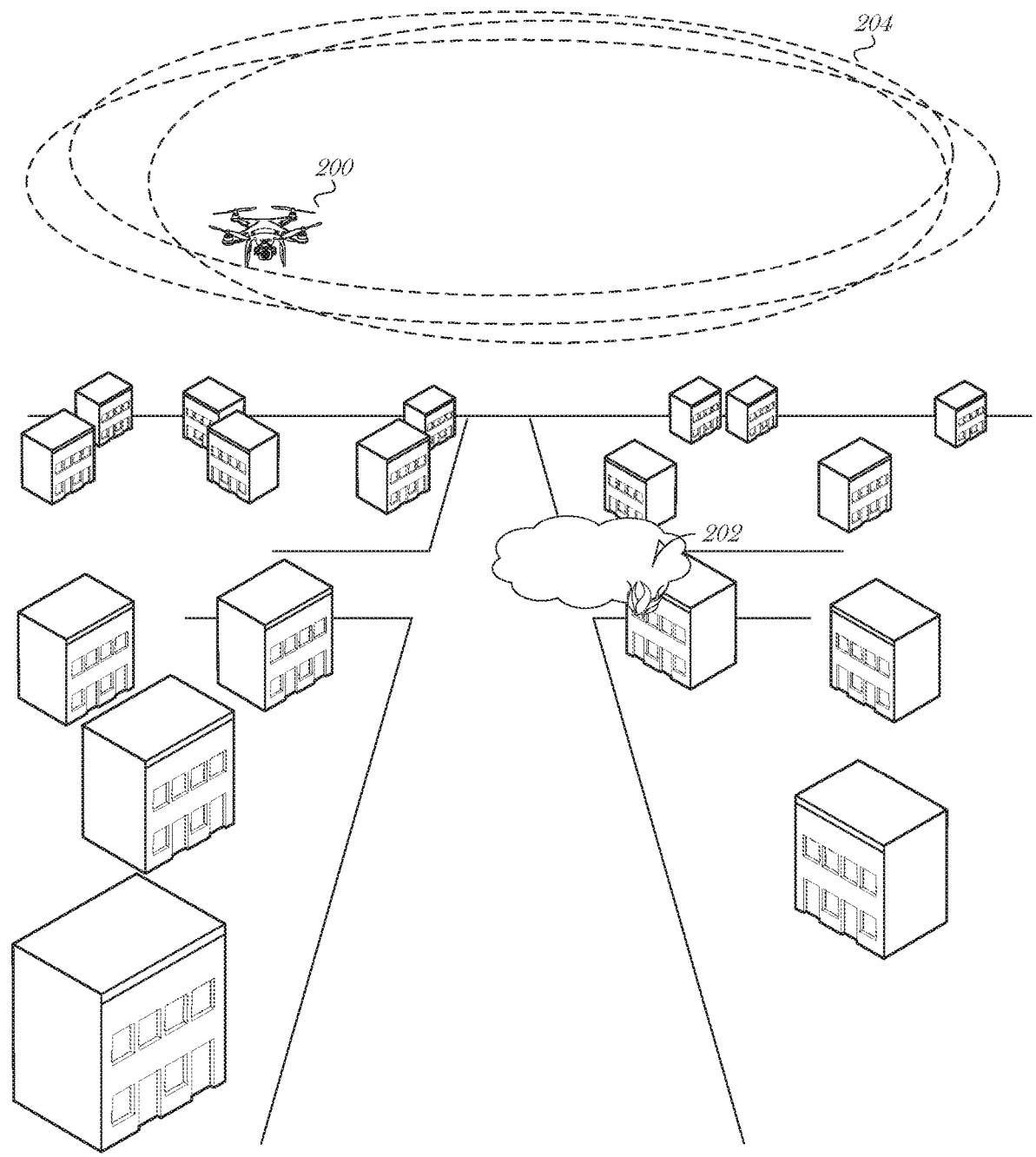
FIGS. 2A-C are diagrams illustrating a sequence of an operational scenario, according to an embodiment.
Figure 2B:
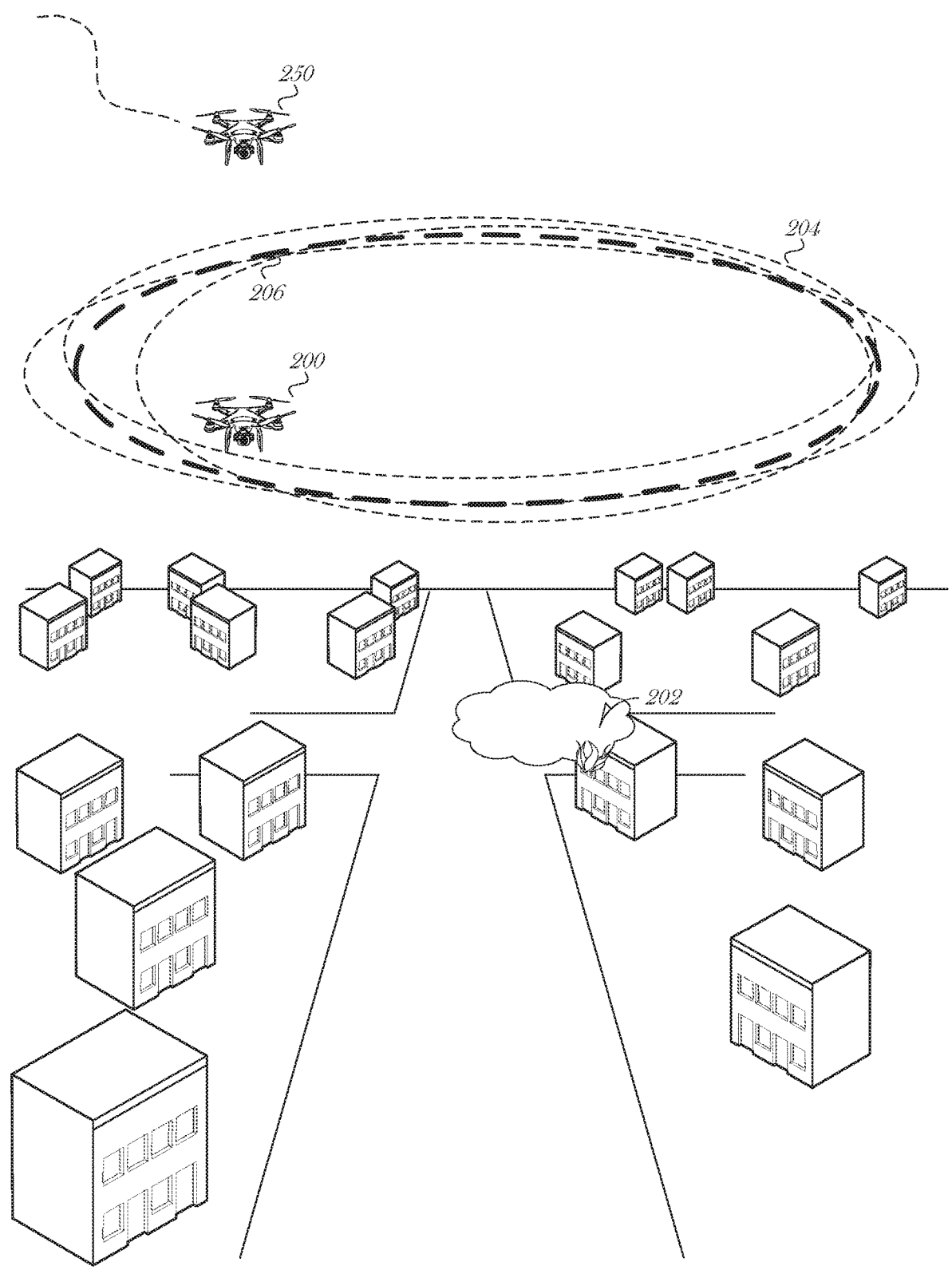
Figure 2C:
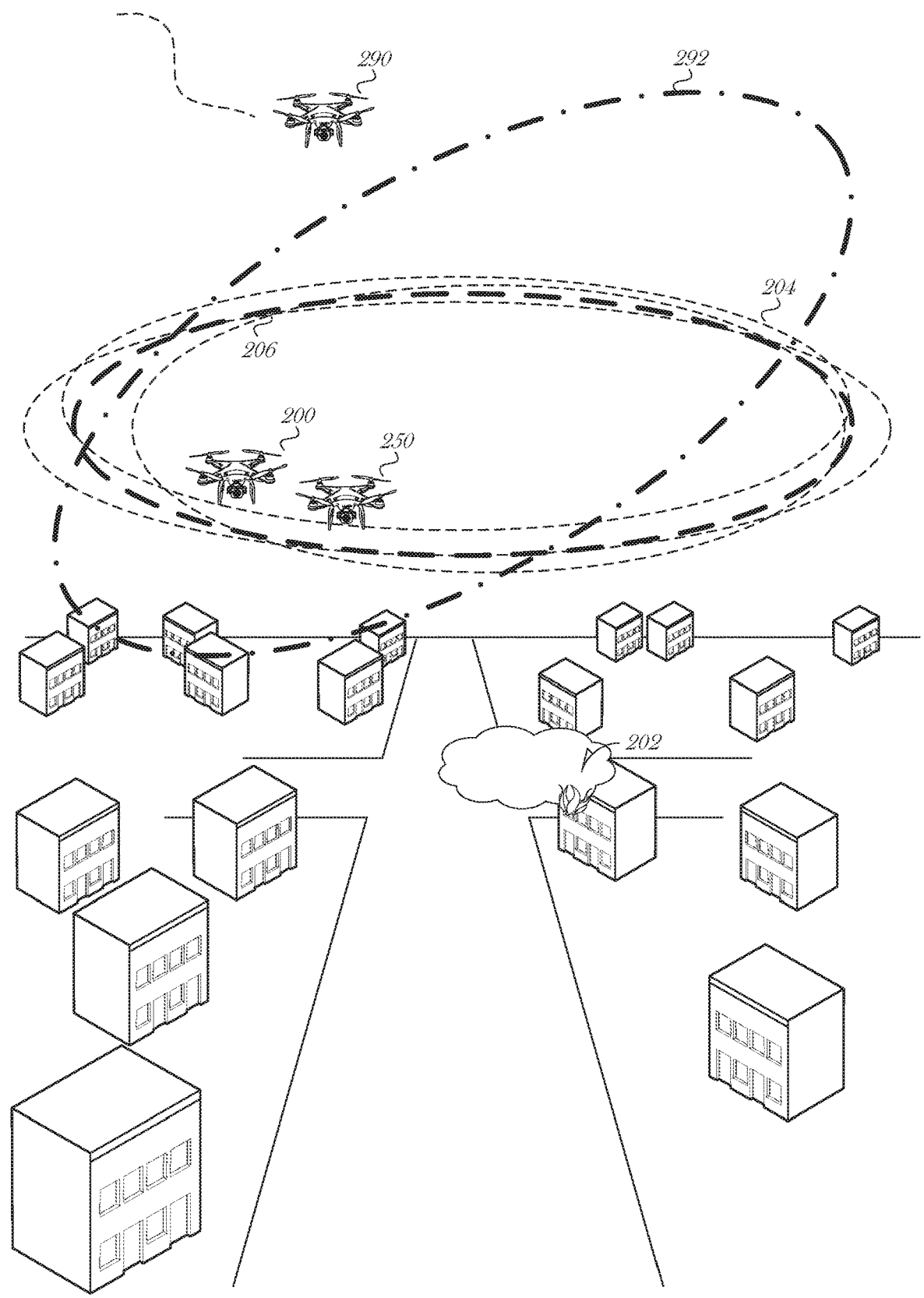

FIGS. 2A-C are diagrams illustrating a sequence of an operational scenario, according to an embodiment. In FIG. 2A, a first drone 200 is operating in an operating theater around a target area 202. An operating theater is a three-dimensional volume centered around the target area 202. One may visualize the operating theater as a dome with the surface of the dome having a constant radius from the target area 202 (e.g., the dome is centered on the target area 202). In other examples, the operating theater may be visualized as a tunnel, for instance when following a moving target area 202. The target area 202 in this context may be the peloton in a bike race, a criminal fleeing police, an advancing fire line, or the like.

The target area 202 is an area of interest. The target area 202 may be related to an event, such as a fire, car accident, sporting event, natural disaster, or the like. It is understood that multiple targets of interest 202 may exist in a single operating theater.

In FIG. 2A, the target area 202 is a relatively stationary event. The first drone 200 may perform several iterations of a flight path 204. However, in some cases the event may be moving. For example, the event may be a race car event or a marathon. In this situation, the flight path 204 may follow the moving event.

In FIG. 2B, a second drone 250 enters the operating theater and signals to the first drone 200 an intent to create or join a swarm. Because the first drone 200 is not yet operating in a swarm, the request from the second drone 250 is treated as a request to create a swarm. Operating in a swarm provides advantages for each drone (200, 250). For instance, by coordinating movements, each drone (200, 250) may be able to operate closer to the target area 202 while alleviating concerns of collisions or other interference.

The iterations may be averaged to obtain a normalized flight path 206 (illustrated as the bold dashed line). The normalized flight path 206 may be computed with an average, a weighted average, or by other calculations to determine a route that approximates the first drone's operation over a measurement period (e.g., the last ten minutes of operation). The normalized flight path 206 is a part of a swarm directive. The normalized flight path 206 may include a series of way points to provide pathing. The normalized flight path 206 may also include an average altitude, an altitude range, a variance of the path (e.g., how wide the normalized flight path 206 may vary), an average flight velocity while traversing the normalized flight path 206, or other parameters to describe and define the normalized flight path 206. The swarm directive is shared with the second drone 250.

The second drone 250 may provide the first drone 200 its own objectives. The objectives of the second drone 250 are expressed as a desired flight path, which may be parameterized as a series of waypoints, a three-dimensional geofence, a target geolocation, a target altitude, or the like. The second drone 250 also provides its flight capabilities to the first drone 200. The flight capabilities may include aspects such as minimum/maximum flight speed, maximum g-force, turning radius, min/max altitude, acceleration capabilities, battery capacity, etc.

A negotiation process may occur as the second drone 250 attempts to join the swarm. Aspects of the operational capacities of each drone in the proposed swarm may be evaluated to ensure that the swarm is able to continue with its swarm directive (e.g., flight path). In the continuing example illustrated in FIG. 2B, the second drone 250 has accepted the existing swarm directive and has adjusted its flight plan to comply with the existing normalized flight path 206.

In FIG. 2C, a third drone 290 approaches the drone swarm of drones 200 and 250. The third drone 290 may receive the advertisement from the lead drone (e.g., first drone 200), and communicate its capabilities and desired flight path 292. The third drone 290 may also receive the swarm directive from the first drone 200. In this case, the desired flight path 292 is significantly different from the swarm directive (e.g., normalized flight path 206).

A second negotiation process occurs with respect to the addition of the third drone 290 to the swarm. The negotiation process may involve all drones already in the swarm (e.g., drones 200, 250), or may be conducted solely by the lead drone (e.g., drone 200). Depending on various factors, the drone swarm may adjust its flight path to conform to the desired flight path 292, the third drone 290 may adjust its operational parameters to adopt the drone swarm's directive (e.g., normalized flight path 206), or some new derived path may be used, where the derived path accommodates both the swarm directive (normalized flight path 206) and the desired flight path 292.

As additional drones seek to join the drone swarm, similar information exchange and negotiation processes are used to determine whether to allow the new drone is added to the swarm and whether the swarm adjusts its swarm directive. Similarly, as drones leave a swarm, the remaining drones in the swarm may negotiate a new swarm directive based on the objectives of the remaining drones.

Figure 3:
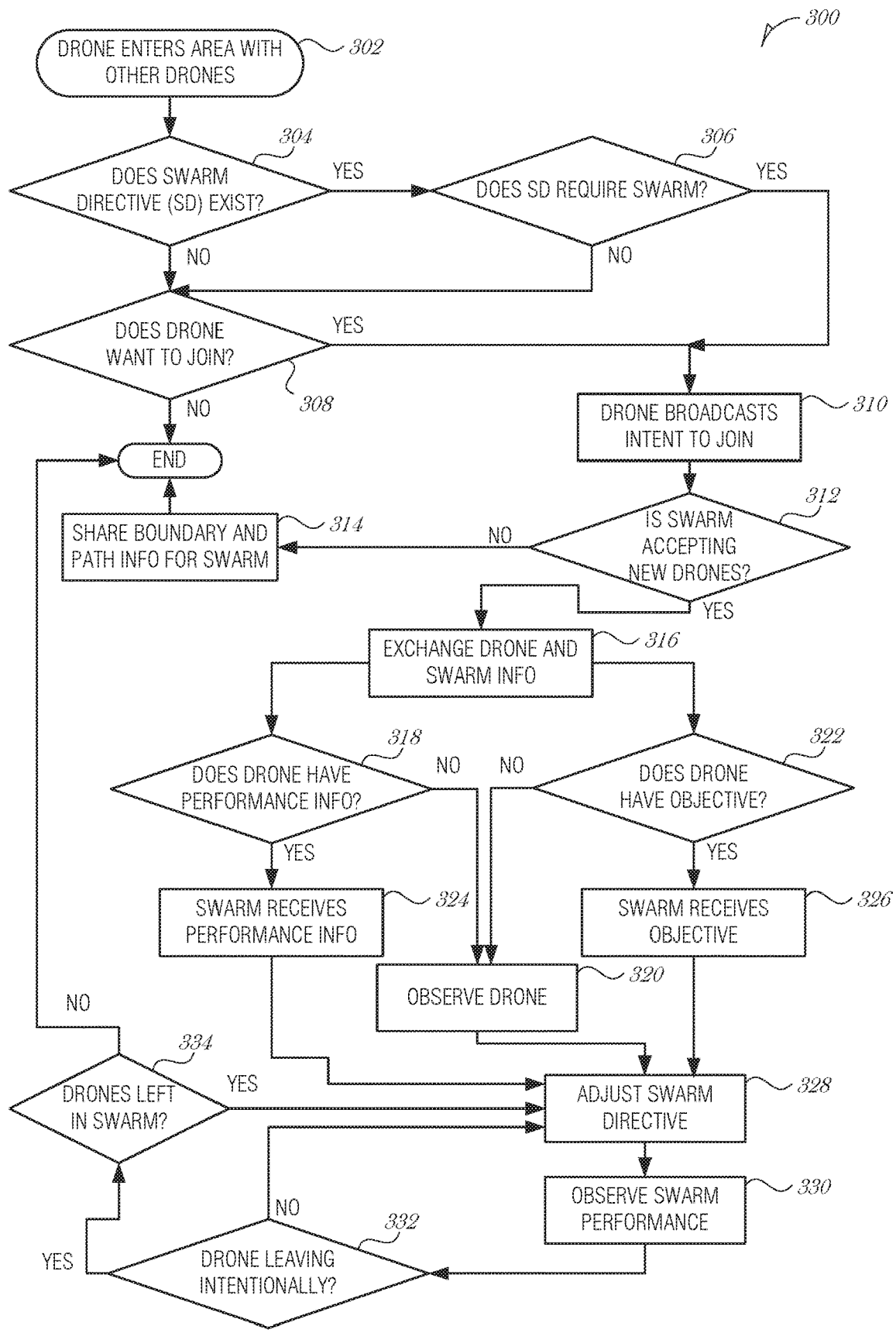
FIG. 3 is a flowchart illustrating a process for swarm management, according to an embodiment.

FIG. 3 is a flowchart illustrating a process 300 for swarm management, according to an embodiment. A drone enters an area where another drone is already operating (e.g., operation theater) (state 302). A swarm directive is advertised using a localized broadcast from a swarm leader declaring that a swarm exists and the properties of the swarm directive (e.g., altitude, position, radius, flight path, etc.). At decision block 304, it is determined whether a swarm directive exists. If there is no swarm directive, then the indication is that there is no existing swarm operating in the area. There may be a swarm directive advertised that does not require a swarm.

For example, a drone may enter an area where other drones are present. The intent of those drone operators may be that they want to operate in close proximity but without a swarm. Drones operating in close proximity without a swarm may be involved in gameplay such as a racing or an obstacle course or other activities that do not require a swarm. In such a case, it will be useful to indicate to a drone entering the spatial area occupied by those drones that a swarm is not intended.

At decision block 306, it is determined whether the swarm directive requires a swarm. If not, then it is determined at decision block 308, whether the new drone wants to join. If the new drone does not want to join the swarm, then the flow ends.

If the new drone wants to join or create a swarm, then it broadcasts an intent to join (operation 310). If there is a swarm, then at decision block 312, it is determined whether the swarm is accepting new drones. If the swarm is not accepting new drones into the swarm, then the swarm's boundary and path information is provided to the new drone (operation 314). Sharing this information may allow for the new drone to operate in a manner that does not interfere with the existing swarms flight path or other operations.

If the swarm is accepting new drones, then the new drone and the swarm exchange information (operation 316). The swarm may provide the swarm directive along with additional information about the swarm, such as operating characteristics, policies, and the like. The new drone may provide information about the drone's capabilities, a manifest, a desired flight plan, or the like. At decision block 318, it is determined whether the new drone has provided any performance information, such as a minimum or maximum altitude, max g-force, velocity range, acceleration characteristics, and other operational parameters. If the new drone does not or cannot provide such performance information, then the swarm may observe the new drone (operation 320). For instance, using onboard sensors of some or all of the drones in the swarm, the swarm leader may obtain information about the new drone's flight characteristics. A machine learning algorithm may be used to classify the new drone's operational characteristics to determine limits or abilities of the new drone.

At decision block 322, it is determined whether the new drone has provided any objectives, for examples, in the form of a flight plan. If the new drone does not or cannot provide objectives, then the swarm may observe the new drone (operation 320) to determine an objective. For example, the swarm may observe a flight path that the new drone consistently or repeatedly uses and derive an objective based on the observed behavior of the new drone.

If the new drone provides performance information or an objective, then the performance information is received (operation 324) or the objective is received (operation 326).

Using the information of an explicit or derived performance capabilities of the new drone, and the explicit or derived objective of the new drone, the drone swarm adjusts the swarm directive to accommodate the new drone's capabilities and objectives (operation 328). Adjusting the swarm directive may include various operations, such as creating a new flight plan for the drone that increases or decreases average flight speed, adjusts banking or other aerial maneuvers, alters the flight plan to provide additional coverage of another event that may be happening in or near the operation theater, or the like.

The swarm performance is observed or monitored by the drone swarm (operation 330). For instance, the drone swarm may not be adhering to the flight plan (drone swarm directive) because one or more drones are unable to maintain performance. If a drone is not performing to a standard reflected in the swarm directive, then the drone may be kicked out of the swarm (decision operation 332). When a drone leaves, intentionally or unintentionally, the swarm directive may be adjusted for any remaining drones (operation 328). If, after a drone has left either intentionally or not, it is determined whether there are any drones left in the drone swarm (decision block 334). If there is only one drone left, or all drones abandon the swarm, then the flow ends. If there are still two or more drones operating together—the minimum number of drones to constitute a drone swarm—then the swarm directive is adjusted for any remaining drones (operation 328).

Multiple swarms may operate near one another. Multiple swarms may operate to observe the same event and coordinate between each other from a leader drone of one swarm to a leader drone of another swarm. The leader drones may negotiate flight paths (swarm directives) that do not conflict or interfere with one another. For instance, one drone swarm may operate a lower altitude than another to avoid aerial collisions. Swarms may merge or split, depending on the overall capabilities of drones in a swarm, the objectives of the drones, environmental factors, or the like. Swarms may merge or split through a coordinated effort between lead drones. Swarms may also merge or split through a more organic process as individual drones opt to leave one swarm to join another.

Figure 4:
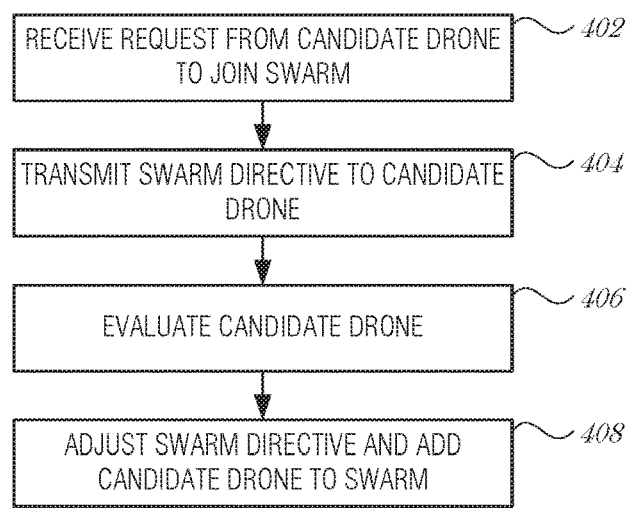
FIG. 4 is a flowchart illustrating a process for orchestration in heterogeneous drone swarms, according to an embodiment.
Figure 5:
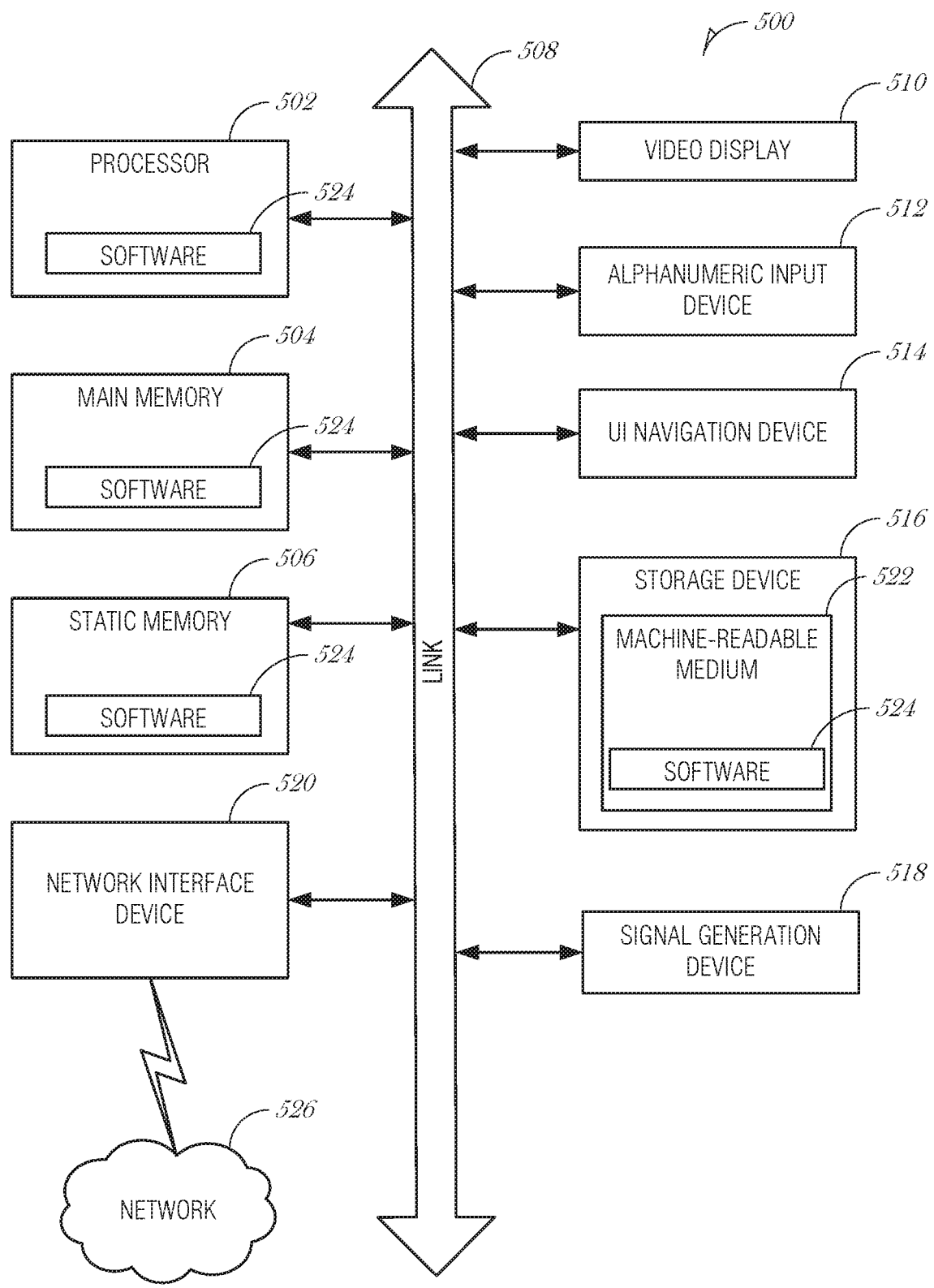
FIG. 5 is a block diagram illustrating an example machine upon which any one or more of the techniques (e.g., methodologies) discussed herein may perform, according to an embodiment.

FIG. 4 is a flowchart illustrating a process 400 for orchestration in heterogeneous drone swarms, according to an embodiment. At 402, a lead drone of a drone swarm receives, from a candidate drone, a request to join the drone swarm.

At 404, a swarm directive is transmitted to the candidate drone. In an embodiment, the swarm directive comprises a flight path of the drone swarm.

At 406, the candidate drone is evaluated to determine whether the candidate drone is compatible with the swarm directive. In an embodiment, evaluating the candidate drone includes transmitting to the candidate drone, a request for a drone profile and receiving the drone profile from the candidate drone. In a further embodiment, the drone profile includes operational characteristics of the candidate drone. In a related embodiment, the operational characteristics include a maximum g-force. In another embodiment, the operational characteristics include a maximum airspeed. In another embodiment, the operational characteristics include a maximum altitude.

In an embodiment, evaluating the candidate drone includes transmitting to the candidate drone, a request for a drone objective and receiving the drone objective from the candidate drone. In a further embodiment, the drone objective includes a target operational theater. In a related embodiment, the drone objective includes a target flight path.

In an embodiment, evaluating the candidate drone includes observing the candidate drone to determine an estimated drone profile. In a further embodiment, the estimated drone profile includes operational characteristics of the candidate drone. In a related embodiment, the operational characteristics include a maximum g-force. In another embodiment, the operational characteristics include a maximum airspeed. In another embodiment, the operational characteristics include a maximum altitude.

In a further embodiment, observing the candidate drone includes obtaining image data about the candidate drone and analyzing the image data to determine flight characteristics or drone capabilities of the candidate drone.

In an embodiment, evaluating the candidate drone includes observing the candidate drone to determine an estimated drone objective. In a further embodiment, the estimated drone objective includes a target operational theater. In a related embodiment, the estimated drone objective includes a target flight path. In a further embodiment, observing the candidate drone includes obtaining image data about the candidate drone and analyzing the image data to determine a flight path of the candidate drone.

At 408, the swarm directive is adjusted to accommodate the candidate drone when the candidate drone is compatible with the swarm directive, to add the candidate drone to the drone swarm. In an embodiment, adjusting the swarm directive to accommodate the candidate drone includes modifying the swarm directive based on at least one of: an operational capability of the candidate drone or an proposed flight path of the candidate drone.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

FIG. 7 is a block diagram illustrating a machine in the example form of a computer system 700, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a component in an autonomous vehicle, a component of a drone, or incorporated in a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, gyrometer, magnetometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G. and 4G LTE/LTE-A, 5G. DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a drone system for orchestration in heterogeneous drone swarms, the system comprising: a processor subsystem; and memory comprising instructions, which when executed by the processor subsystem, cause the processor subsystem to perform the operations comprising: receiving, at a lead drone of a drone swarm, from a candidate drone, a request to join the drone swarm; transmitting a swarm directive to the candidate drone; evaluating the candidate drone to determine whether the candidate drone is compatible with the swarm directive; and adjusting the swarm directive to accommodate the candidate drone when the candidate drone is compatible with the swarm directive, to add the candidate drone to the drone swarm.

In Example 2, the subject matter of Example 1 includes, wherein the swarm directive comprises a flight path of the drone swarm.

In Example 3, the subject matter of Examples 1-2 includes, wherein the instructions for evaluating the candidate drone comprise instructions to perform operations comprising: transmitting to the candidate drone, a request for a drone profile; and receiving the drone profile from the candidate drone.

In Example 4, the subject matter of Example 3 includes, wherein the drone profile includes operational characteristics of the candidate drone.

In Example 5, the subject matter of Example 4 includes, wherein the operational characteristics include a maximum g-force.

In Example 6, the subject matter of Examples 4-5 includes, wherein the operational characteristics include a maximum airspeed.

In Example 7, the subject matter of Examples 4-6 includes, wherein the operational characteristics include a maximum altitude.

In Example 8, the subject matter of Examples 1-7 includes, wherein the instructions for evaluating the candidate drone comprise instructions to perform operations comprising: transmitting to the candidate drone, a request for a drone objective; and receiving the drone objective from the candidate drone.

In Example 9, the subject matter of Example 8 includes, wherein the drone objective includes a target operational theater.

In Example 10, the subject matter of Examples 8-9 includes, wherein the drone objective includes a target flight path.

In Example 11, the subject matter of Examples 1-10 includes, wherein the instructions for evaluating the candidate drone comprise instructions to perform operations comprising observing the candidate drone to determine an estimated drone profile.

In Example 12, the subject matter of Example 11 includes, wherein the estimated drone profile includes operational characteristics of the candidate drone.

In Example 13, the subject matter of Example 12 includes, wherein the operational characteristics include a maximum g-force.

In Example 14, the subject matter of Examples 12-13 includes, wherein the operational characteristics include a maximum airspeed.

In Example 15, the subject matter of Examples 12-14 includes, wherein the operational characteristics include a maximum altitude.

In Example 16, the subject matter of Examples 11-15 includes, wherein the instructions for observing the candidate drone comprise instructions to perform operations comprising: obtaining image data about the candidate drone; and analyzing the image data to determine flight characteristics or drone capabilities of the candidate drone.

In Example 17, the subject matter of Examples 1-16 includes, wherein the instructions for evaluating the candidate drone comprise instructions to perform operations comprising observing the candidate drone to determine an estimated drone objective.

In Example 18, the subject matter of Example 17 includes, wherein the estimated drone objective includes a target operational theater.

In Example 19, the subject matter of Examples 17-18 includes, wherein the estimated drone objective includes a target flight path.

In Example 20, the subject matter of Examples 17-19 includes, wherein the instructions for observing the candidate drone comprise instructions to perform operations comprising: obtaining image data about the candidate drone; and analyzing the image data to determine a flight path of the candidate drone.

In Example 21, the subject matter of Examples 1-20 includes, wherein the instructions for adjusting the swarm directive to accommodate the candidate drone comprise instructions to perform operations comprising modifying the swarm directive based on at least one of: an operational capability of the candidate drone or an proposed flight path of the candidate drone.

Example 22 is a method of orchestration in heterogeneous drone swarms, the method comprising: receiving, at a lead drone of a drone swarm, from a candidate drone, a request to join the drone swarm; transmitting a swarm directive to the candidate drone; evaluating the candidate drone to determine whether the candidate drone is compatible with the swarm directive; and adjusting the swarm directive to accommodate the candidate drone when the candidate drone is compatible with the swarm directive, to add the candidate drone to the drone swarm.

In Example 23, the subject matter of Example 22 includes, wherein the swarm directive comprises a flight path of the drone swarm.

In Example 24, the subject matter of Examples 22-23 includes, wherein evaluating the candidate drone comprises: transmitting to the candidate drone, a request for a drone profile; and receiving the drone profile from the candidate drone.

In Example 25, the subject matter of Example 24 includes, wherein the drone profile includes operational characteristics of the candidate drone.

In Example 26, the subject matter of Example 25 includes, wherein the operational characteristics include a maximum g-force.

In Example 27, the subject matter of Examples 25-26 includes, wherein the operational characteristics include a maximum airspeed.

In Example 28, the subject matter of Examples 25-27 includes, wherein the operational characteristics include a maximum altitude.

In Example 29, the subject matter of Examples 22-28 includes, wherein evaluating the candidate drone comprises: transmitting to the candidate drone, a request for a drone objective; and receiving the drone objective from the candidate drone.

In Example 30, the subject matter of Example 29 includes, wherein the drone objective includes a target operational theater.

In Example 31, the subject matter of Examples 29-30 includes, wherein the drone objective includes a target flight path.

In Example 32, the subject matter of Examples 22-31 includes, wherein evaluating the candidate drone comprises observing the candidate drone to determine an estimated drone profile.

In Example 33, the subject matter of Example 32 includes, wherein the estimated drone profile includes operational characteristics of the candidate drone.

In Example 34, the subject matter of Example 33 includes, wherein the operational characteristics include a maximum g-force.

In Example 35, the subject matter of Examples 33-34 includes, wherein the operational characteristics include a maximum airspeed.

In Example 36, the subject matter of Examples 33-35 includes, wherein the operational characteristics include a maximum altitude.

In Example 37, the subject matter of Examples 32-36 includes, wherein observing the candidate drone comprises: obtaining image data about the candidate drone; and analyzing the image data to determine flight characteristics or drone capabilities of the candidate drone.

In Example 38, the subject matter of Examples 22-37 includes, wherein evaluating the candidate drone comprises observing the candidate drone to determine an estimated drone objective.

In Example 39, the subject matter of Example 38 includes, wherein the estimated drone objective includes a target operational theater.

In Example 40, the subject matter of Examples 38-39 includes, wherein the estimated drone objective includes a target flight path.

In Example 41, the subject matter of Examples 38-40 includes, wherein observing the candidate drone comprises: obtaining image data about the candidate drone; and analyzing the image data to determine a flight path of the candidate drone.

In Example 42, the subject matter of Examples 22-41 includes, wherein adjusting the swarm directive to accommodate the candidate drone comprises modifying the swarm directive based on at least one of: an operational capability of the candidate drone or an proposed flight path of the candidate drone.

Example 43 is at least one machine-readable medium including instructions, which when executed by a machine, cause the machine to perform operations of any of the methods of Examples 22-42.

Example 44 is an apparatus comprising means for performing any of the methods of Examples 22-42.

Example 45 is an apparatus for orchestration in heterogeneous drone swarms, the apparatus comprising: means for receiving, at a lead drone of a drone swarm, from a candidate drone, a request to join the drone swarm; means for transmitting a swarm directive to the candidate drone; means for evaluating the candidate drone to determine whether the candidate drone is compatible with the swarm directive; and means for adjusting the swarm directive to accommodate the candidate drone when the candidate drone is compatible with the swarm directive, to add the candidate drone to the drone swarm.

In Example 46, the subject matter of Example 45 includes, wherein the swarm directive comprises a flight path of the drone swarm.

In Example 47, the subject matter of Examples 45-46 includes, wherein the means for evaluating the candidate drone comprise: means for transmitting to the candidate drone, a request for a drone profile; and means for receiving the drone profile from the candidate drone.

In Example 48, the subject matter of Example 47 includes, wherein the drone profile includes operational characteristics of the candidate drone.

In Example 49, the subject matter of Example 48 includes, wherein the operational characteristics include a maximum g-force.

In Example 50, the subject matter of Examples 48-49 includes, wherein the operational characteristics include a maximum airspeed.

In Example 51, the subject matter of Examples 48-50 includes, wherein the operational characteristics include a maximum altitude.

In Example 52, the subject matter of Examples 45-51 includes, wherein evaluating the candidate drone comprises: transmitting to the candidate drone, a request for a drone objective; and receiving the drone objective from the candidate drone.

In Example 53, the subject matter of Example 52 includes, wherein the drone objective includes a target operational theater.

In Example 54, the subject matter of Examples 52-53 includes, wherein the drone objective includes a target flight path.

In Example 55, the subject matter of Examples 45-54 includes, wherein the means for evaluating the candidate drone comprise means for observing the candidate drone to determine an estimated drone profile.

In Example 56, the subject matter of Example 55 includes, wherein the estimated drone profile includes operational characteristics of the candidate drone.

In Example 57, the subject matter of Example 56 includes, wherein the operational characteristics include a maximum g-force.

In Example 58, the subject matter of Examples 56-57 includes, wherein the operational characteristics include a maximum airspeed.

In Example 59, the subject matter of Examples 56-58 includes, wherein the operational characteristics include a maximum altitude.

In Example 60, the subject matter of Examples 55-59 includes, wherein the means for observing the candidate drone comprise: means for obtaining image data about the candidate drone; and means for analyzing the image data to determine flight characteristics or drone capabilities of the candidate drone.

In Example 61, the subject matter of Examples 45-60 includes, wherein the means for evaluating the candidate drone comprise means for observing the candidate drone to determine an estimated drone objective.

In Example 62, the subject matter of Example 61 includes, wherein the estimated drone objective includes a target operational theater.

In Example 63, the subject matter of Examples 61-62 includes, wherein the estimated drone objective includes a target flight path.

In Example 64, the subject matter of Examples 61-63 includes, wherein the means for observing the candidate drone comprise: means for obtaining image data about the candidate drone; and means for analyzing the image data to determine a flight path of the candidate drone.

In Example 65, the subject matter of Examples 45-64 includes, wherein the means for adjusting the swarm directive to accommodate the candidate drone comprise means for modifying the swarm directive based on at least one of: an operational capability of the candidate drone or an proposed flight path of the candidate drone.

Example 66 is at least one machine-readable medium including instructions for orchestration in heterogeneous drone swarms, the instructions when executed by a machine, cause the machine to perform the operations comprising: receiving, at a lead drone of a drone swarm, from a candidate drone, a request to join the drone swarm; transmitting a swarm directive to the candidate drone; evaluating the candidate drone to determine whether the candidate drone is compatible with the swarm directive; and adjusting the swarm directive to accommodate the candidate drone when the candidate drone is compatible with the swarm directive, to add the candidate drone to the drone swarm.

In Example 67, the subject matter of Example 66 includes, wherein the swarm directive comprises a flight path of the drone swarm.

In Example 68, the subject matter of Examples 66-67 includes, wherein the instructions for evaluating the candidate drone comprise instructions for: transmitting to the candidate drone, a request for a drone profile; and receiving the drone profile from the candidate drone.

In Example 69, the subject matter of Example 68 includes, wherein the drone profile includes operational characteristics of the candidate drone.

In Example 70, the subject matter of Example 69 includes, wherein the operational characteristics include a maximum g-force.

In Example 71, the subject matter of Examples 69-70 includes, wherein the operational characteristics include a maximum airspeed.

In Example 72, the subject matter of Examples 69-71 includes, wherein the operational characteristics include a maximum altitude.

In Example 73, the subject matter of Examples 66-72 includes, wherein the instructions for evaluating the candidate drone comprise instructions for: transmitting to the candidate drone, a request for a drone objective; and receiving the drone objective from the candidate drone.

In Example 74, the subject matter of Example 73 includes, wherein the drone objective includes a target operational theater.

In Example 75, the subject matter of Examples 73-74 includes, wherein the drone objective includes a target flight path.

In Example 76, the subject matter of Examples 66-75 includes, wherein the instructions for evaluating the candidate drone comprise instructions for observing the candidate drone to determine an estimated drone profile.

In Example 77, the subject matter of Example 76 includes, wherein the estimated drone profile includes operational characteristics of the candidate drone.

In Example 78, the subject matter of Example 77 includes, wherein the operational characteristics include a maximum g-force.

In Example 79, the subject matter of Examples 77-78 includes, wherein the operational characteristics include a maximum airspeed.

In Example 80, the subject matter of Examples 77-79 includes, wherein the operational characteristics include a maximum altitude.

In Example 81, the subject matter of Examples 76-80 includes, wherein the instructions for observing the candidate drone comprise instructions for: obtaining image data about the candidate drone; and analyzing the image data to determine flight characteristics or drone capabilities of the candidate drone.

In Example 82, the subject matter of Examples 66-81 includes, wherein the instructions for evaluating the candidate drone comprise instructions for observing the candidate drone to determine an estimated drone objective.

In Example 83, the subject matter of Example 82 includes, wherein the estimated drone objective includes a target operational theater.

In Example 84, the subject matter of Examples 82-83 includes, wherein the estimated drone objective includes a target flight path.

In Example 85, the subject matter of Examples 82-84 includes, wherein the instructions for observing the candidate drone comprise instructions for: obtaining image data about the candidate drone; and analyzing the image data to determine a flight path of the candidate drone.

In Example 86, the subject matter of Examples 66-85 includes, wherein the instructions for adjusting the swarm directive to accommodate the candidate drone comprise instructions for: modifying the swarm directive based on at least one of: an operational capability of the candidate drone or an proposed flight path of the candidate drone.

Example 87 is at least one machine-readable medium including instructions that, when executed by processing circuitry, cause the processing circuitry to perform operations to implement of any of Examples 1-86.

Example 88 is an apparatus comprising means to implement of any of Examples 1-86.

Example 89 is a system to implement of any of Examples 1-86.

Example 90 is a method to implement of any of Examples 1-86.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first." "second." and "third." etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A drone system for orchestration in heterogeneous drone swarms, the system comprising:
  a processor subsystem; and
  memory comprising instructions, which when executed by the processor subsystem, cause the processor subsystem to perform the operations comprising:
    receiving, at a lead drone of a drone swarm, from a candidate drone, a request to join the drone swarm;
    transmitting a swarm directive to the candidate drone;
    evaluating the candidate drone to determine whether the candidate drone is compatible with the swarm directive; and
    adjusting the swarm directive to accommodate the candidate drone when the candidate drone is compatible with the swarm directive, to add the candidate drone to the drone swarm.

2. The system of claim 1, wherein the swarm directive comprises a flight path of the drone swarm.

3. The system of claim 1, wherein the instructions for evaluating the candidate drone comprise instructions to perform operations comprising:
  transmitting to the candidate drone, a request for a drone profile; and
  receiving the drone profile from the candidate drone.

4. The system of claim 3, wherein the drone profile includes operational characteristics of the candidate drone.

5. The system of claim 4, wherein the operational characteristics include a maximum g-force.

6. The system of claim 4, wherein the operational characteristics include a maximum airspeed.

7. The system of claim 4, wherein the operational characteristics include a maximum altitude.

8. The system of claim 1, wherein the instructions for evaluating the candidate drone comprise instructions to perform operations comprising:
  transmitting to the candidate drone, a request for a drone objective; and
  receiving the drone objective from the candidate drone.

9. The system of claim 8, wherein the drone objective includes a target operational theater.

10. The system of claim 8, wherein the drone objective includes a target flight path.

11. The system of claim 1, wherein the instructions for evaluating the candidate drone comprise instructions to perform operations comprising observing the candidate drone to determine an estimated drone profile.

12. The system of claim 11, wherein the estimated drone profile includes operational characteristics of the candidate drone.

13. The system of claim 12, wherein the operational characteristics include a maximum g-force.

14. The system of claim 12, wherein the operational characteristics include a maximum airspeed.

15. The system of claim 12, wherein the operational characteristics include a maximum altitude.

16. The system of claim 11, wherein the instructions for observing the candidate drone comprise instructions to perform operations comprising:
  obtaining image data about the candidate drone; and
  analyzing the image data to determine flight characteristics or drone capabilities of the candidate drone.

17. The system of claim 1, wherein the instructions for evaluating the candidate drone comprise instructions to perform operations comprising observing the candidate drone to determine an estimated drone objective.

18. The system of claim 17, wherein the estimated drone objective includes a target operational theater.

19. The system of claim 17, wherein the estimated drone objective includes a target flight path.

20. The system of claim 17, wherein the instructions for observing the candidate drone comprise instructions to perform operations comprising:
  obtaining image data about the candidate drone; and
  analyzing the image data to determine a flight path of the candidate drone.

21. The system of claim 1, wherein the instructions for adjusting the swarm directive to accommodate the candidate drone comprise instructions to perform operations comprising modifying the swarm directive based on at least one of: an operational capability of the candidate drone or an proposed flight path of the candidate drone.

22. A method of orchestration in heterogeneous drone swarms, the method comprising:
  receiving, at a lead drone of a drone swarm, from a candidate drone, a request to join the drone swarm;
  transmitting a swarm directive to the candidate drone;
  evaluating the candidate drone to determine whether the candidate drone is compatible with the swarm directive; and
  adjusting the swarm directive to accommodate the candidate drone when the candidate drone is compatible with the swarm directive, to add the candidate drone to the drone swarm.

23. The method of claim 22, wherein adjusting the swarm directive to accommodate the candidate drone comprises modifying the swarm directive based on at least one of: an operational capability of the candidate drone or an proposed flight path of the candidate drone.

24. At least one non-transitory machine-readable medium including instructions for orchestration in heterogeneous drone swarms, the instructions when executed by a machine, cause the machine to perform the operations comprising:
  receiving, at a lead drone of a drone swarm, from a candidate drone, a request to join the drone swarm;
  transmitting a swarm directive to the candidate drone;
  evaluating the candidate drone to determine whether the candidate drone is compatible with the swarm directive; and
  adjusting the swarm directive to accommodate the candidate drone when the candidate drone is compatible with the swarm directive, to add the candidate drone to the drone swarm.

25. The at least one non-transitory machine-readable medium of claim 24, wherein the instructions for evaluating the candidate drone comprise instructions for:
  transmitting to the candidate drone, a request for a drone objective; and
  receiving the drone objective from the candidate drone.

* * * * *